United States Patent [19]
Xenophou

[11] 3,968,831
[45] July 13, 1976

[54] SYSTEM OF USING VACUUM FOR CONTROLLING HEAT TRANSFER IN BUILDING STRUCTURES, MOTOR VEHICLES AND THE LIKE

[76] Inventor: Theodore Xenophou, 16 Karri Drive, Dernancourt, South Australia, Australia, 5075

[22] Filed: May 26, 1971

[21] Appl. No.: 146,955

[30] Foreign Application Priority Data
May 29, 1970 Australia............................ 1347/70

[52] U.S. Cl.................................... 165/1; 165/53; 165/96
[51] Int. Cl.² ........................................ F25B 13/00
[58] Field of Search .................. 165/32, 96, 1, 105; 52/406, 382; 29/455

[56] References Cited
UNITED STATES PATENTS

| | | | |
|---|---|---|---|
| 3,018,087 | 1/1962 | Steele | 165/105 |
| 3,167,159 | 1/1965 | Bovenkerk | 165/96 X |
| 3,270,802 | 9/1966 | Lindberg | 165/96 |
| 3,450,196 | 6/1969 | Bauer | 165/32 |

Primary Examiner—Albert W. Davis, Jr.
Assistant Examiner—James D. Liles
Attorney, Agent, or Firm—Kinzer, Plyer, Dorn & McEachran

[57] ABSTRACT

A method of controlling thermal transfer in structures which are defined by walls which comprises drawing a partial vacuum between spaced panels forming said wall in conjunction with a supporting frame, and controlling thermal transfer by regulating the vacuum at appropriate times such as by reducing the vacuum when ambient temperatures are required in the structure, and then increasing the vacuum to maintain the then ambient temperature in the structure by decreasing heat flow through the walls to hold the temperature inspite of outside ambient variations.

2 Claims, 2 Drawing Figures

SYSTEM OF USING VACUUM FOR CONTROLLING HEAT TRANSFER IN BUILDING STRUCTURES, MOTOR VEHICLES AND THE LIKE

BACKGROUND OF THE INVENTION

This invention relates to a system for controlling heat transfer in building structures, motor vehicles and the like.

It is well known that buildings and other structures and objects tend to heat up in the daytime and cool down at night particularly in areas where substantial temperature differences exist and therefore it has been customary to provide insulation in the walls of the building to give some control of the degree of heat transfer and thus maintain the buildings in livable condition.

In areas where there is extensive heating during the day and high temperature drops at night as in the inland of Australia this temperature difference can be quite a problem and elaborate and expensive air conditioning units are usually installed, as well as using thermal insulation such as rock-wool bats or the like in walls and ceilings, or between panels forming the structure.

As well as being expensive, such known systems introduce noise when air conditioners require to move substantial volumes of air, and also structures of this nature are heavy and difficult to transport if prefabrication is resorted to.

It is known that lightweight structures with good thermal insulation are highly desirable and objects of the present invention are to provide improvements which will eliminate the difficulties referred to above.

THE INVENTION

The present invention makes use of heat gradients to control the actual temperature at any required time, this being achieved by having a variable degree of vacuum in the walls of the building or structure at appropriate localities so that the amount of heat transfer through the walls can be varied according to the extent of the vacuum existing at the time.

Thus according to one form in an area where excessive day temperatures are involved, the vacuum can be brought nearer to normal pressures at night and therefore there will be a transfer of low temperature into the building at that time when ambient temperatures are relatively low, but by then increasing the vacuum the lower temperature can be held within the structure throughout the next day and thus make living conditions much more comfortable. The same can apply to vehicles and the like, but for convenience the invention will generally be described in relation to building structures but is not to be limited thereto.

Similarly in the winter where a building reaches reasonable temperatures during the day it is possible at this stage to allow the inside of the building to assume this temperature by removing the vacuum from the walls and allow heat transfer, but before there is a substantial loss of temperature the vacuum can be again introduced and the building will then remain at a temperature which is consistent with the daytime temperature or at least closely related thereto.

The actual construction of such a building can of course be considerably varied but it is envisaged that the walls of the building can comprise aluminium or similar panels which have a space between them but with stiffening members to allow the space to be lowered in pressure to the required vacuum value without collapsing the panels the construction thus including infill material of a cellular nature or bats which are sufficiently porous but incompressible to allow the vacuum to be generated. A series of projections could also be used which should however be of a nature such that heat transfer through this infill material does not take place to any great extent under vacuum conditions.

The various hollow sections of the building so formed which can comprise the outer walls and the inner walls as required and can include double glazed windows or the like, can be performed and fitted together on the site, but the cavities within the walls are as said of a sealed nature and therefore by connecting these to a vacuum pump the required vacuum can be maintained at those times when this is desirable.

According to a modification, walls in which low heat transfer is required could have a pre-applied vacuum and the panels could then be sealed, and in such a case of course it would be possible to maintain a permanent seal in the walls and thus make them of a low heat conductive nature, and heating or cooling of the building could then take place by drawing in outside air of the required temperature at the appropriate time and thus again controlling the temperature because if the rooms are raised to the required temperature when ambient temperature is of the correct value, it will be obvious that the walls containing the vacuum will maintain this temperature within reasonable limits for a considerable time.

By using aluminium or aluminium clad walls it is possible to prefabricate these sealed panels in a factory and to evacuate and seal them and to simply then assemble the structure as required.

PREFERRED CONSTRUCTION

Figure 1:
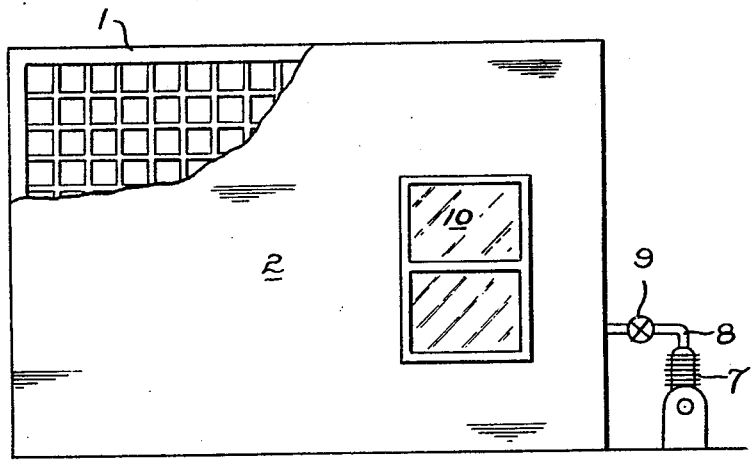
FIG. 1 is a side elevation of a wall arranged to be evacuated to control thermal transmission.
Figure 2:
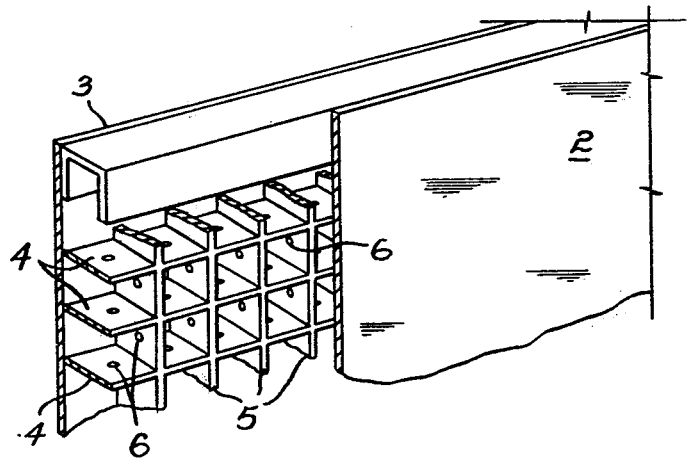
FIG. 2 is a fragmentary perspective view of a corner of a wall with part of the covering panel on one side removed to show how the panels are supported against the induced vacuum.

An outer frame 1 has panels 2 and 3 bonded to it by any means which ensure an air tight seal, such as by welding.

The space between the panels 2 and 3 contains a cellular structure comprising intersecting strips 4 and 5 which extend between the panels 2 and 3 to maintain their spacing under vacuum.

The strips 4 and 5 have apertures 6 to allow air to be drawn out of the cells of the structure.

A vacuum pump 7 is connected by a vacuum line 8 to the inside of the structure to allow the space between the panels 2 and 3 to have the air withdrawn to the required value. A value 9 can be used to hold the vacuum or release it as required.

Instead of changing the degree of vacuum, a window or the like can be opened in the wall at correct ambient conditions to allow air flow through the said walls.

Such a window is indicated by 10.

Having thus described my invention what I claim is:

1. The method of controlling thermal transfer in structures occupied by humans, defined by walls which comprises: drawing a partial vacuum between spaced panels forming said walls in conjunction with spaced cellular stiffening members in which the cells are in communication with each other to allow air equalization throughout the space enclosed by said panels and members, and controlling thermal transfer by regulating the vacuum so that thermal transfer is permitted by reducing the vacuum when ambient conditions are required within the structure to allow heat flow through the panels, and then increasing the vacuum to maintain the structure at the selected temperature by decreasing heat flow through the walls of the structure due to the increased vacuum.

2. In a method as defined in claim 1, a wall for a structure comprising a frame, panels secured to each side of said frame and sealed to the frame to provide a sealed space therebetween, spacing means between said panels comprising spacing members extending between said panels and joined thereto, and means periodically to produce at least a partial vacuum in the panels whereby said wall has controllable thermal conductivity to control temperatures within a structure formed by such walls reducing the barrier to thermal transfer when ambient conditions are required in the structure and then increasing the vacuum to hold the ambient temperature within the structure in spite of variations of temperature outside of the structure.

* * * * *